United States Patent [19]

Heineman

[11] Patent Number: 5,465,366
[45] Date of Patent: Nov. 7, 1995

[54] POWER CONTROL MODULE FOR COMPUTER MONITORS

[75] Inventor: Lee J. Heineman, Philadelphia, Pa.

[73] Assignee: Energy Concepts, Inc., Rockland, Del.

[21] Appl. No.: 117,515

[22] Filed: Sep. 3, 1993

[51] Int. Cl.⁶ .................................................. G06F 1/32
[52] U.S. Cl. ............................................... 395/750
[58] Field of Search ........................... 395/750; 364/707, 364/848.3; 371/11, 66

[56] References Cited

U.S. PATENT DOCUMENTS

| | | | |
|---|---|---|---|
| 3,412,395 | 1/1968 | Kiene | 340/421 |
| 3,668,686 | 6/1972 | Strohmeyer | 340/324 A |
| 3,941,989 | 3/1976 | McLaughlin et al. | 235/156 |
| 3,955,185 | 5/1976 | Nishimura | 340/324 R |
| 4,001,808 | 1/1977 | Ebihara et al. | 340/336 |
| 4,032,760 | 6/1977 | Quarton et al. | 235/151 |
| 4,293,927 | 10/1981 | Hoshii | 395/750 |
| 4,317,181 | 2/1982 | Teza et al. | 364/707 |
| 4,336,478 | 6/1982 | Quilty et al. | 313/478 |
| 4,363,108 | 12/1982 | Lange et al. | 364/900 |
| 4,495,629 | 1/1985 | Zasio et al. | 377/70 |
| 4,527,250 | 7/1985 | Galdun et al. | 364/900 |
| 4,569,019 | 2/1986 | DiOrio et al. | 364/410 |
| 4,575,579 | 3/1986 | Simon et al. | 178/4 |
| 4,631,588 | 12/1986 | Barnes et al. | 358/149 |
| 4,639,891 | 1/1987 | Porcher et al. | 364/900 |
| 4,654,821 | 3/1987 | Lapp | 395/750 |
| 4,675,537 | 6/1987 | Mione | 307/38 |
| 4,698,748 | 10/1987 | Juzswil et al. | 364/750 |
| 4,746,994 | 5/1988 | Ettlinger | 360/13 |
| 4,767,280 | 8/1988 | Markuson et al. | 417/44 |
| 4,789,907 | 12/1988 | Fischetti et al. | 360/33.1 |
| 4,806,784 | 2/1989 | Goda | 307/125 |
| 4,809,163 | 2/1989 | Hirosawa et al. | 364/200 |
| 4,811,200 | 3/1989 | Wagner et al. | 364/200 |
| 4,839,917 | 6/1989 | Oliver | 379/45 |
| 4,922,450 | 5/1990 | Rose et al. | 395/750 |
| 4,985,848 | 1/1991 | Pfeiffer et al. | 364/518 |
| 5,027,212 | 6/1991 | Marlton et al. | 358/183 |
| 5,058,041 | 10/1991 | Rose et al. | 364/521 |
| 5,059,961 | 10/1991 | Cheng | 340/720 |
| 5,083,266 | 1/1992 | Watanabe | 395/275 |
| 5,091,832 | 2/1992 | Tortola et al. | 362/109 |
| 5,109,348 | 4/1992 | Pfeiffer et al. | 395/164 |

FOREIGN PATENT DOCUMENTS 0172344 2/1986 European Pat. Off. .

*Primary Examiner*—Gopal C. Ray
*Assistant Examiner*—Xuong M. Chung-Trans
*Attorney, Agent, or Firm*—Volpe and Koenig

[57] ABSTRACT

A self-contained power control module for controlling power to the peripheral output devices of an electronic data processing system. The power control module automatically interrupts power to the peripheral output devices of the system after a predetermined interval has elapsed without detection of data input, and restores power to the peripheral output devices upon detection of data input. A pulse detection circuit, connected to the peripheral input devices, monitors the peripheral input devices for data pulses. A timing module, connected to the pulse detection circuit, is reset upon the detection of a data pulse. After a predetermined interval has elapsed without detection of a data pulse, the timing module outputs a control signal to two switches. A power switch, disposed between the power supply and the peripheral output device, controls power to the peripheral output device in response to the control signal from the timing module. A data switch, disposed between the peripheral input device and the microprocessor of the data processing system, controls input of data to the microprocessor in response to the control signal from the timing module.

11 Claims, 4 Drawing Sheets

POWER CONTROL MODULE FOR COMPUTER MONITORS

FIELD OF THE INVENTION

Generally, the present invention pertains to devices for controlling the power to peripheral devices of a data processing system. More particularly, it pertains to a power control module for controlling power to a monitor after a predetermined interval has elapsed without any data input. Most particularly, it pertains to a power control module that may be retrofitted to an existing data processing system.

BACKGROUND OF THE INVENTION

Over the last decade, the computing speed of microprocessors has increased dramatically, and the price of microprocessors and other semiconductor devices has plummeted. This has provided a wide range of users greater access to computers and other electronic goods such as home video game systems. Computers have become commonplace in businesses, educational institutions, and homes.

Advancements in electronics and semiconductors are occurring at such a rapid pace that many personal computers are obsolete within a few years. In order to obtain the productivity increases available from increased computing power, many businesses have, at great expense, replaced their computing systems every few years. However, computer monitors can be used for many years and do not always require replacement with subsequent computer systems. This can mean savings of hundreds of dollars for each monitor that is reused on a subsequent system.

Home video game systems have also become commonplace. These systems often utilize a standard television set as a monitor to provide the operator with interactive entertainment. However, this use of a television set as a monitor can greatly shorten the useful life of the television.

The useful life of a monitor is usually limited by two factors, "burn in" and power-on hours. The first factor, "burn in", is caused by constant display of the same image on the monitor screen causing "ghost" images on the screen. This results in poor video quality which can be very distracting to the operator. The second factor, power-on hours, relates monitor life directly to the number of hours the monitor is in operation.

Software is currently available to "blank" the monitor screen after a predetermined interval has elapsed without data input. This is commonly called screen saver software. Although screen saver software addresses the problem of "burn in", the monitor is still in operation. Therefore, screen saver software does not reduce power-on hours.

The purchase price of a monitor varies widely depending upon quality, size, and capability. Each monitor has a specification defined by mean-time-to-failure (MTTF) which is a projection of the possibility that failure will occur. MTTF directly relates to power-on hours. Therefore, by reducing power-on hours to substantially match actual usage hours, significant repair and replacement savings can be realized by extending the life of the monitor.

Due to the tremendous increase in the number of personal computers in use, personal computers represent one of the fastest growing segments of electricity use. However, significant energy savings can be achieved by reducing the unused power-on hours of a monitor. In many offices, personal computers are left unattended for the majority of each work day. In homes, power to the monitor is often left on after the operator has finished using the video game system. Thus, a majority of the power-on time of the monitor may not be effectively used by an operator.

To alleviate these problems, a power control module which is responsive to a peripheral input device is installed between the power supply and the monitor. If the operator is not actively entering data, power to the monitor is turned off after a predetermined interval has elapsed. Power to the monitor will be restored when the operator activates a data input device.

SUMMARY OF THE INVENTION

The present invention provides a self-contained power control module for controlling power to the peripheral output devices of an electronic data processing system having at least a power supply, a microprocessor, and a peripheral input device. The power control module automatically interrupts power to the peripheral output devices after a predetermined interval has elapsed without detection of any data input, and restores power to the peripheral output devices upon detection of any data input.

A pulse detection circuit is connected to the peripheral input devices. The pulse detection circuit monitors the peripheral input devices for data pulses. A timing module, connected to the detection circuit, is reset upon the detection of a data pulse. After a predetermined interval has elapsed without detection of a data pulse, the timing module outputs a control signal to two switches.

A power switch, disposed between the power supply and the peripheral output device, controls power to the peripheral output device in response to the control signal from the timing module. Similarly, a data switch, disposed between the peripheral input device and the microprocessor, controls input of data to the microprocessor in response to the control signal.

An object of the invention is to provide a self-contained power control module for controlling power to the peripheral output devices of an electronic data processing system, in response to detection of any data input from peripheral input devices.

Other objects and advantages will be apparent to those skilled in the art from the following description of a presently preferred embodiment.

DESCRIPTION OF THE PREFERRED EMBODIMENT

Figure 1:
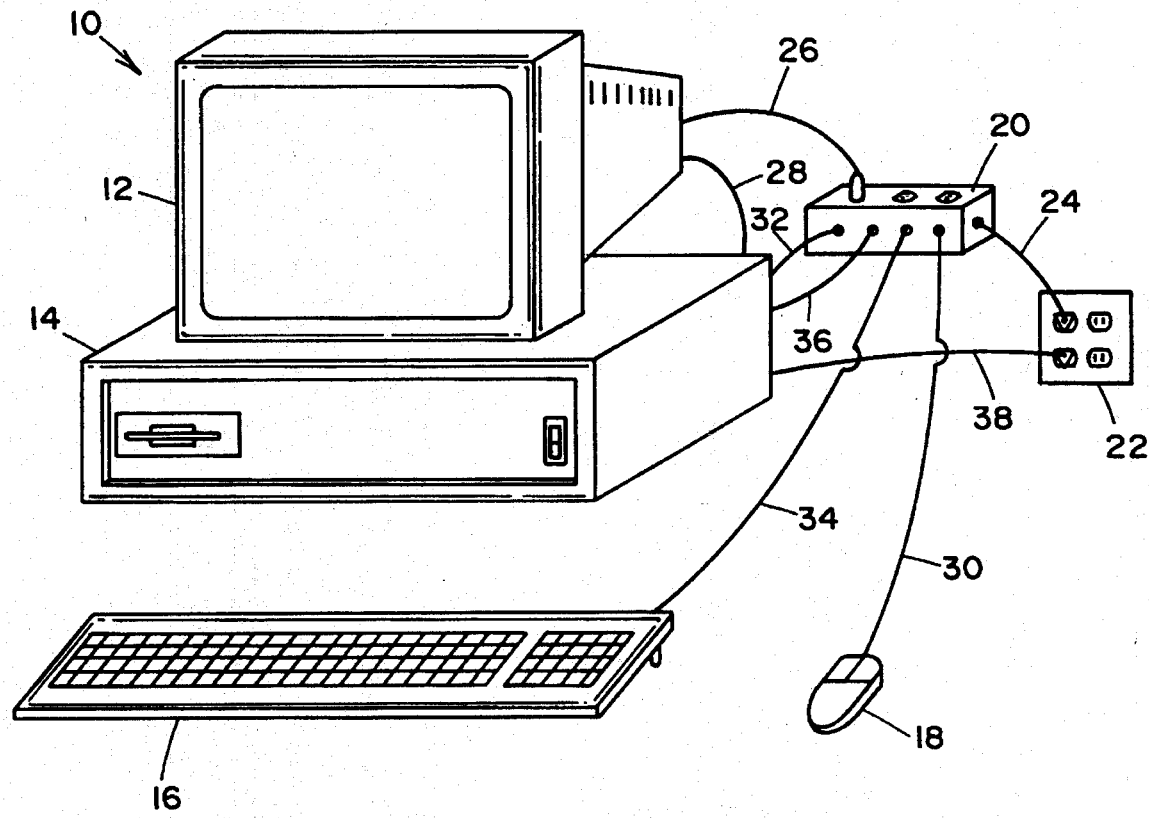
FIG. 1 is a representation of a computer system utilizing the present invention.

The preferred embodiment will be described with reference to the drawing figures wherein the same numeral indicates a like element throughout.

Referring to FIG. 1, a power control module 20 is shown installed on an electronic data processing system 10 that includes a peripheral output device, shown in FIG. 1 as a monitor 12. A power supply 22 is provided for the system 10. In most common applications, the power supply 22 is a standard 120 volt AC power line. The power supply 22 provides power to the microprocessor, shown in FIG. 1 as part of a computer 14, via a conductor 38. Independently, the power supply 22 provides power to the monitor 12 through the power control module 20.

Peripheral input devices are shown in FIG. 1 as a keyboard 16 and a mouse 18. Data from the keyboard 16 passes through the power control module 20 to the computer 14. Likewise, data from the mouse 18 passes through the power control module 20 to the computer 14. The computer 14 outputs to the monitor 12 through a data line 28.

Figure 2:
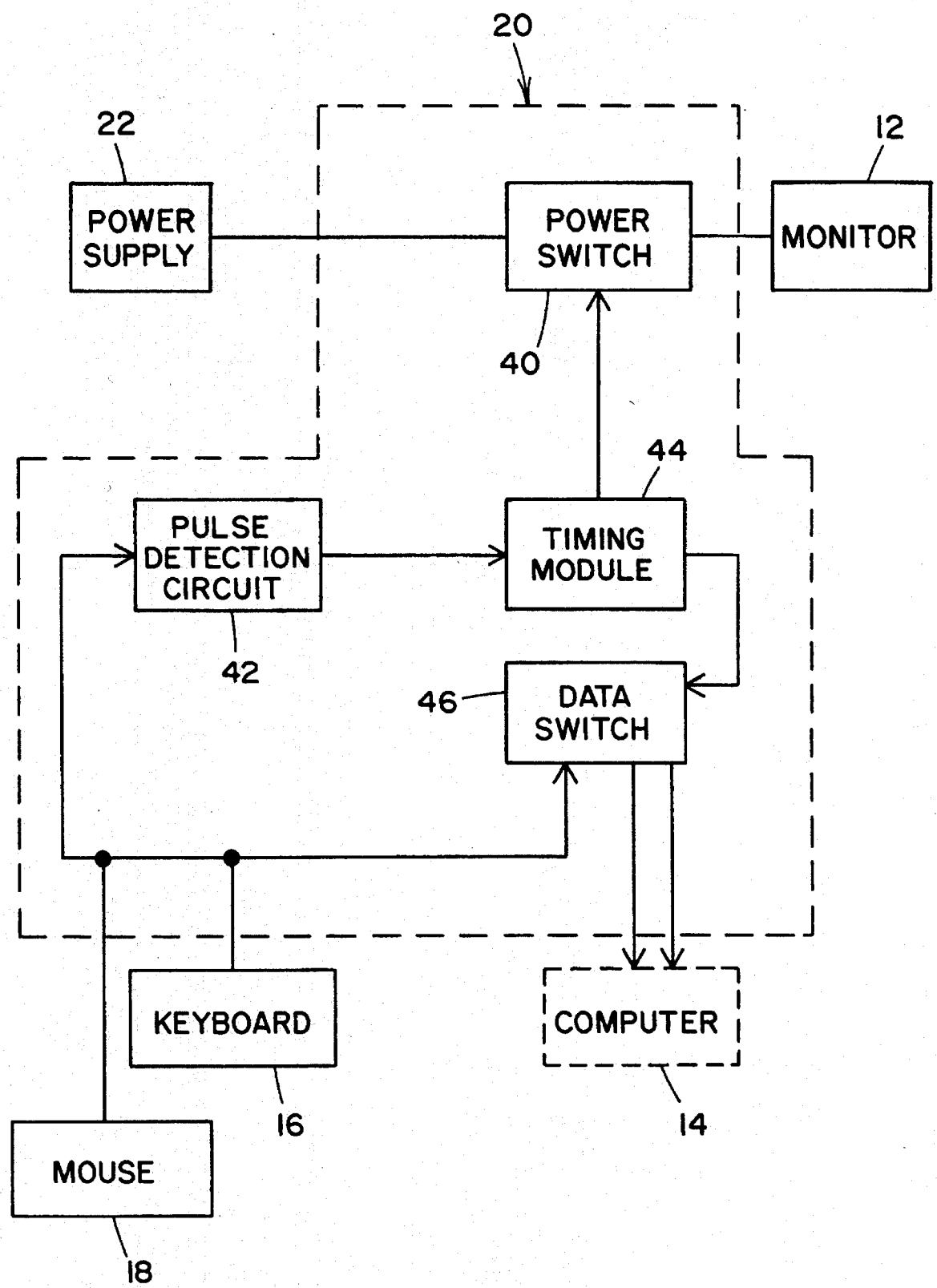
FIG. 2 is a block diagram of a power control module in a system in accordance with the present invention.

Operation of the power control module 20 will be explained with reference to FIG. 2. The power control module 20 is electrically disposed between the power supply 22 and the monitor 12, and between the peripheral input devices 16, 18 and the computer 14. When data is input to the peripheral input devices 16, 18, data pulses follow a data path from the peripheral input devices 16, 18 through the data switch 46 into the computer The peripheral input devices 16, 18 are electrically connected to an electronic pulse detection circuit 42. This detection circuit 42 detects data pulses from the peripheral input devices 16, 18 whenever data is input, and sends a pulse to a timing module 44. The timing module 44 also provides a missing pulse detection function. Upon detection of a pulse from the detection circuit 42, the timing module 44 is reset and sends a control signal to two switches, a zero-crossing power switch 40 and a data switch 46. The control signal causes the switches 40, 46 to enter the "closed" state. Thus, power is supplied to the monitor 12, and data from the peripheral input devices 16, 18 passes to the computer 14.

After a predetermined interval has elapsed without any data input, the timing module 44 times out, and sends a control signal which causes the two switches 40, 46 to enter the "open" state. In the "open" state, both the power supply 22 and the data path from the peripheral input devices 16, 18 to the computer 14 are electrically isolated.

Upon detection, by the detection circuit 42, of a reactivation pulse (i.e., the first pulse) from a peripheral input device 16, 18, the timing module 44 is reset, and sends a control signal that causes the switches 40, 46 to enter the "closed" state, thereby restoring the connection between the power supply 22 and the monitor 12, and the data path from the peripheral input devices 16, 18 to the computer 14.

Figure 3:
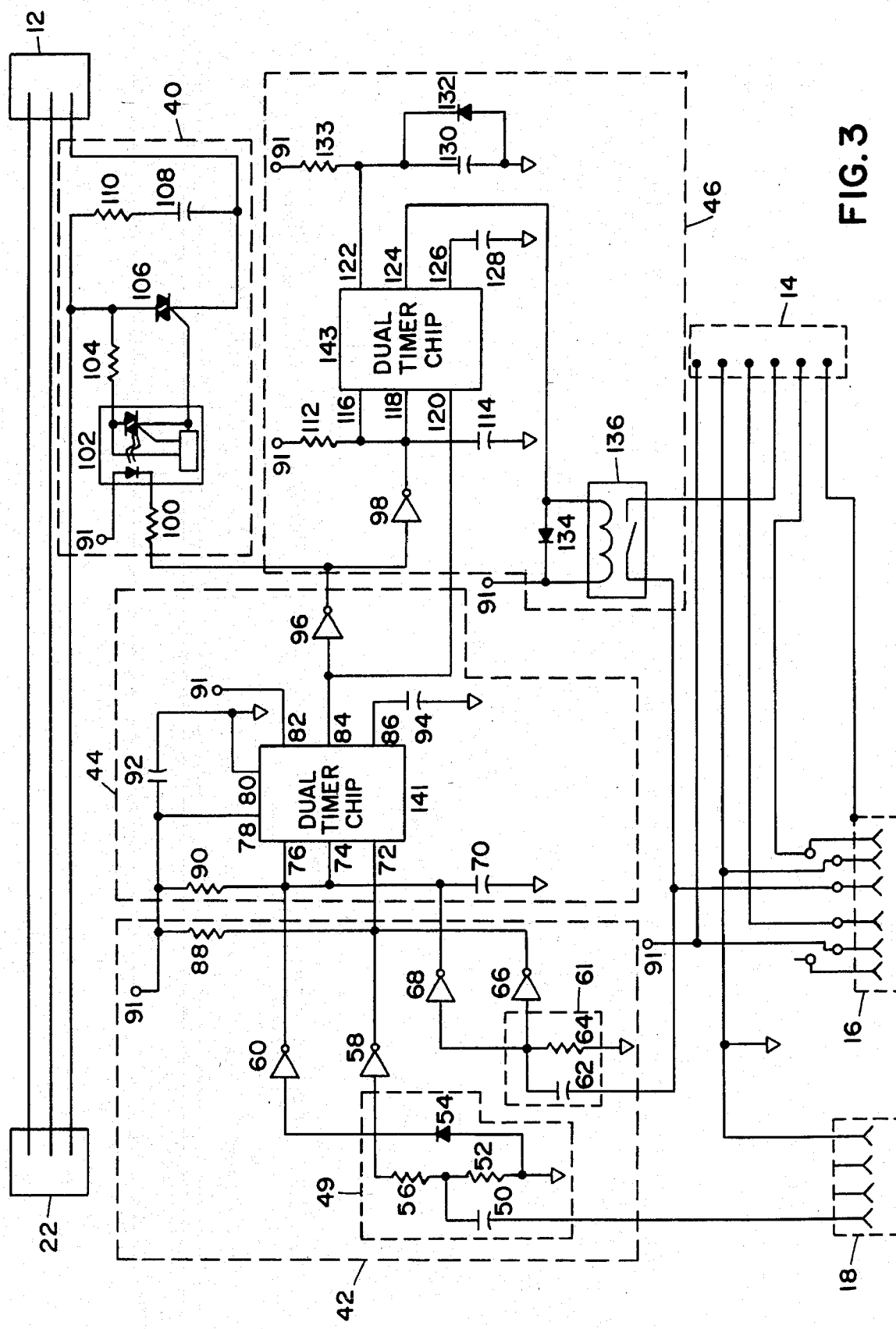
FIG. 3 is a schematic diagram of the system of FIG. 2.

Referring now to FIG. 3, data pulses from the keyboard enter the detection circuit 42 through a pulse conditioner 61, which is connected to two inverters 66, 68. Data pulses from the mouse 18 enter the detection circuit 42 through a pulse conditioner 49, which is connected to two inverters 58, 60.

The output signals from the inverters 58, 66 are sent to the TRIGGER input 72 of a dual timer chip 140 having two timers 141, 143. (The dual timer chip is preferably a dual timer, model number SE556CN, manufactured by Signetics.) The output signals from the inverters 60, 68 are sent to a first timing constant circuit comprising a resistor 90 and a capacitor 70, and to the DISCHARGE and THRESHOLD inputs 74, 76 of the first timer 141. Power to the dual timer chip 140 is supplied by a control power supply 91, which is filtered by a capacitor 92 connected to ground. The control power supply 91 is fed from the keyboard 16 power conductor. The control power supply 91 is also connected to the RESET pin 82 of the first timer 141. A capacitor 94 connects the CONTROL pin 86 of the first timer 141 to ground.

The pulses generated by the peripheral input devices 16, 18 appear to the first timer 141, at the TRIGGER, THRESHOLD, and DISCHARGE inputs 72, 74, 76 as low signals that reset the first timer 141. The TRIGGER input 72 recovers to the pre-pulse high level almost immediately.

However, since the THRESHOLD and DISCHARGE inputs 74, 76, are connected to the capacitor 70, these inputs 74, 76 do not recover to the pre-pulse high level for a predetermined duration, set by the first timing constant circuit. In the preferred embodiment, the duration is approximately 15.0 minutes. Each time a data pulse is detected by the detection circuit 42, the capacitor 70 discharges and the first timer 141 is reset, thereby restarting the 15.0 minute timing period.

During the timing period, the signals to the first timer 141 are low at the THRESHOLD and DISCHARGE inputs 74, 76, and high at the TRIGGER input 72. The output 84 of the first timer 141 is latched high. This signal is fed to the zero-crossing power switch 40 through an inverter 96 and a resistor 100. The inverter 96 inverts this high signal to a low signal thereby causing the zero-crossing power switch 40 to enter the "closed" state. The zero-crossing power switch 40 comprises an optoisolator 102, a triac 106, and a resistor 104. The optoisolator 102 provides optical isolation of the control portion of the power control module 20 from the power supply 22. The optoisolator 102 turns on triac 106 thereby allowing power to flow from the power supply 22 to the monitor 12. A resistor 110 and a capacitor 108 provide a filter to the switching effects of the triac 106. The zero-crossing power switch 40 prevents power surges during switch 40 closure, thereby eliminating a source of monitor 12 failure. The output signal is also fed to the data switch 46 concurrently through the inverters 96, 98 to the DISCHARGE and THRESHOLD inputs 116, 118 of the second timer 143, and directly to the TRIGGER input 120 of the second timer 143. The output signal from the inverter 98 is sent to a second timing constant circuit comprising a resistor 112 and a capacitor 114. The duration of the second timing constant circuit is set for the "capture" of the reactivation pulse by the second timer 143.

Since the signals to the second timer 143 are high at the DISCHARGE, THRESHOLD, and TRIGGER inputs 116, 118, 120 during the timing period, the output 124 is latched low. The low signal output causes the a relay 136 to enter the "closed" state, thereby allowing data to pass from the peripheral input devices 16, 18 to the computer 14. A capacitor 128 connects the CONTROL pin 126 of the second timer 143 to ground. The RESET pin 122 is biased by the circuit comprising a resistor 133, a capacitor 130, and a diode 132. This reset biasing circuit is used during initial power-up of the computer system 10. The circuit causes the second timer 143 to output a low signal, causing the relay 136 to enter the "closed" state. This ensures that the keyboard 16 is detected when booting the computer 14.

After the period set by the first timing constant circuit has elapsed without any data input, the signals at the TRIGGER, THRESHOLD, and DISCHARGE inputs 72, 74, 76 will all be high and the first timer 141 times out, latching its output 84 low. This causes the zero-crossing power switch 40 to enter the "open" state, thereby electrically isolating the power supply 22 from the monitor 12. Signals to the second timer 143 at the DISCHARGE, THRESHOLD, and TRIGGER inputs 116, 118, 120 will all be low, grounding the capacitor 114. The second timer 143 is now reset, however, it will not begin timing until the capacitor 114 is no longer grounded, (i.e., when it receives a high signal). The output 124 of the second timer 143 will be latched high, thereby causing the relay 136 to enter the "open" state.

During the time that the power supply 22 and the data path are isolated, the power control module 20 continues to monitor the peripheral input devices 16, 18 for any data input by the operator. The first pulse detected from the peripheral input devices 16, 18 is called the reactivation pulse.

When a reactivation pulse is detected by the detection circuit 42, the first timer 141 is reset and its output 84 is latched high. This causes the zero-crossing power switch 40 to enter the "closed" state, restoring power to the monitor 12. The high output signal is presented at the TRIGGER input 120 and at the DISCHARGE and THRESHOLD 116, 118 inputs across the capacitor 114. The capacitor 114, no longer grounded, begins charging and starts the second timer 143. When the second timer 143 times out, it will cause the relay 136 to enter the "closed" state. However, the delay by the second timer 143 causes the relay 136 to stay in the "open" state during the reactivation pulse. This effectively "captures" the pulse by not allowing it to enter the computer 14. When the second timer 143 times out, it will provide a low output signal and cause the relay 136 to enter the "closed" state.

Figure 4:
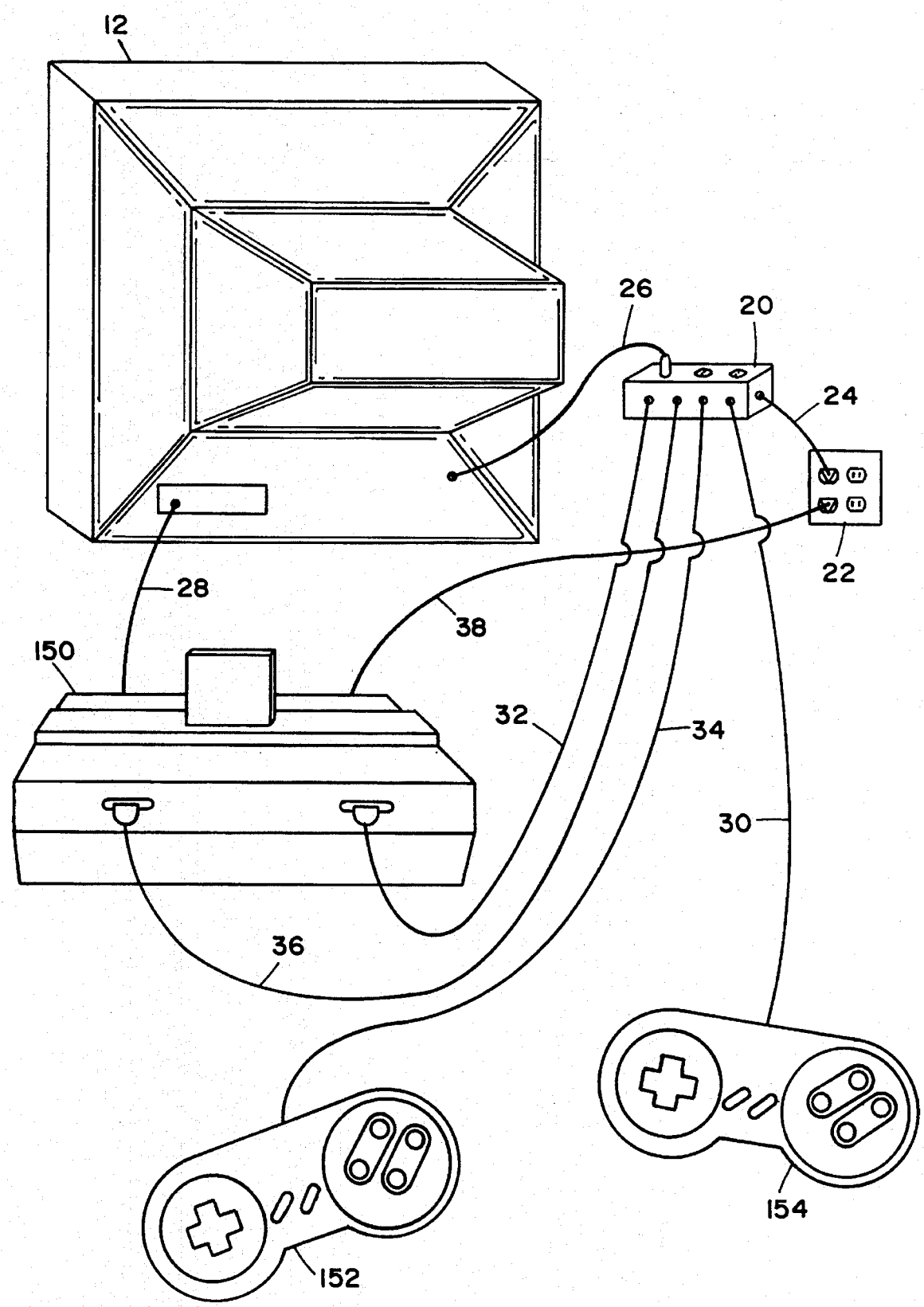
FIG. 4 is a representation of a home video game system utilizing the present invention.

A second embodiment, adapted for use with a home video game system 150, is shown in FIG. 4. This embodiment is the same as FIG. 1 except that the peripheral input devices 152, 154 are shown as control paddles and the microprocessor is shown as part of a home video game system 150, such as Super Nintendo Entertainment System® (registered trademark of Nintendo America, Inc.) Also the reverse perspective of the monitor 12 is displayed to show connection of the power and data lines 26, 28 to the monitor 12.

It can be seen from the teachings herein that the power control module 20 can be used with many different types of peripheral input and output devices. For example, the peripheral input devices described herein include a keyboard 16, a mouse and control paddles 152, 154. The peripheral input devices could include a track ball, a joystick, a control knob, a push button, or many other peripheral input devices. Similarly, the peripheral output device of the power control module 20, was described herein as a monitor 12. This peripheral output device could be a printer, a plotter, or a modem.

What I claim is:

1. A self-contained AC power control module for controlling the AC power to at least one peripheral output device associated with an existing electronic data processing system having at least an AC power supply, a microprocessor, and an associated peripheral input device, comprising:
   a data path terminating on a1 first end in an input coupling means for coupling with the peripherial input device and on a second end in an output coupling means for coupling with the data processing system;
   said data path including data switching means for enabling or disabling the flow of data pulses through said data path;
   a power path terminating on a first end in an input coupling means for coupling with an AC power source and on a second end in an output coupling means for coupling with the peripherial output device;
   said power path including power switching means for selectively enabling or disabling AC power through said power path;
   a detection circuit coupled to said data path upstream of said data switch means, responsive to pulses received via said data path input coupling means;
   a timing module, connected to said detection circuit, which is reset by each detected pulse and which times out after a predetermined duration, for outputting a control signal to said data and power switching means;
   said power switching means comprising a zero-crossing AC power switch, for monitoring the AC voltage and for controlling the AC supply power to the peripheral output device in response to the control signal and the detected voltage; and
   said data switching means comprising a data switch, for controlling input of data to the microprocessor in response to the control signal.

2. The self-contained power control module of claim 1, wherein at least one of the peripheral output devices is a monitor.

3. The self-contained power control module of claim 1, wherein at least one of the peripheral output devices is a printer.

4. The self-contained power control module of claim 1, wherein at least one of the peripheral output devices is a plotter.

5. The self-contained power control module of claim 1, wherein at least one of the peripheral output devices is a modem.

6. The self-contained power control module of claim 1, wherein at least one of the peripheral input devices is a keyboard.

7. The self-contained power control module of claim 1, wherein at least one of the peripheral input devices is a mouse.

8. The self-contained power control module of claim 1, wherein at least one of the peripheral input devices is a joystick.

9. The self-contained power control module of claim 1, wherein the electronic data processing system is a computer.

10. The self-contained power control module of claim 1, wherein the electronic data processing system is a home video game system.

11. A self-contained power control module for controlling the AC power to a monitor associated with an existing computer system having at least an AC power supply, microprocessor, and a keyboard, comprising:
    a housing,
    a power path comprising:
        at least one output AC power socket, within the housing, for reception of an electrical connection to the monitor;
        an electrical plug, for connecting to an AC power supply; and
        an AC power conductor, connecting the electrical plug to the output power socket;
    a data path comprising:
        a data input socket, for receiving data pulses from a keyboard; and
        a data output socket, for transmitting data pulses to the computer; and
    means for electrically isolating the AC power conductor from the output AC power socket and the data input socket from the data output socket, the means comprising;
        a detection circuit, responsive to a data pulse detected on the data path;
        a timing module, connected to the detection circuit, for timing the interval between successive detected data pulses and for outputting a control signal to first and second switching means;
        said first switching means comprising an AC zero-crossing power switch, connected to the AC power socket and the AC power conductor for detecting the AC voltage and for controlling AC power to the monitor in response to the control signal and the detected voltage; and
        said second switching means comprising a data switch, connected to the data input socket and the data output socket, for controlling input of data to the computer in response to the control signal.

* * * * *

UNITED STATES PATENT AND TRADEMARK OFFICE
CERTIFICATE OF CORRECTION

PATENT NO. : 5,465,366
DATED : November 7, 1995
INVENTOR(S) : Lee J. Heineman

It is certified that error appears in the above-indentified patent and that said Letters Patent is hereby corrected as shown below:

In column 3, at line 19, after "computer", insert --14--.
In column 3, at line 45, after "keyboard", insert --16--.

Col. 5, line 40, prior to "first" delete --1--.
Col. 6, line 31, prior to "microprocessor," insert --a--.

Signed and Sealed this

Twenty-eighth Day of May, 1996

Attest:

BRUCE LEHMAN

Attesting Officer          Commissioner of Patents and Trademarks